J. PAILCA.

Tire-Setters.

No. 5,565. Reissued September 9, 1873.

Attest
J. S. Brown,
E. M. Gallaher.

Inventor.
Joseph Pailca
By his atty
R. D. Smith

THE NORRIS PETERS CO., PHOTO-LITHO., WASHINGTON, D. C.

UNITED STATES PATENT OFFICE.

JOSEPH PAILCA, OF LEDYARD, NEW YORK.

IMPROVEMENT IN TIRE-SETTERS.

Specification forming part of Letters Patent No. 122,778, dated January 16, 1872; reissue No. 5,565, dated September 9, 1873; application filed July 16, 1873.

*To all whom it may concern:*

Be it known that I, JOSEPH PAILCA, of Ledyard, in the county of Cayuga and State of New York, have invented a new and useful Improvement in Tire Setting; and I do hereby declare the following to be a full, clear, and exact description of the same, reference being had to the accompanying drawings, in which—

Figure 1:
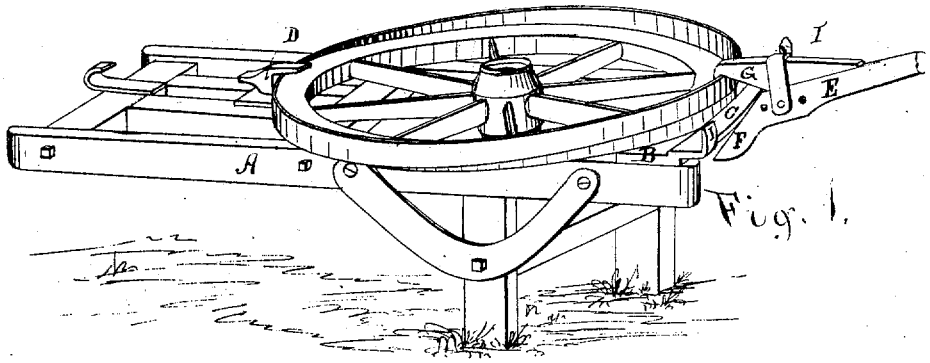
Figure 2:
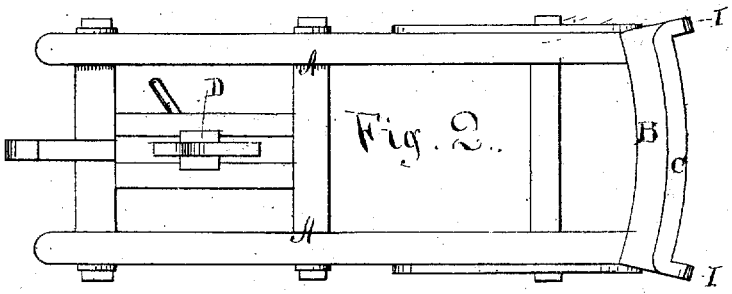
Figure 3:
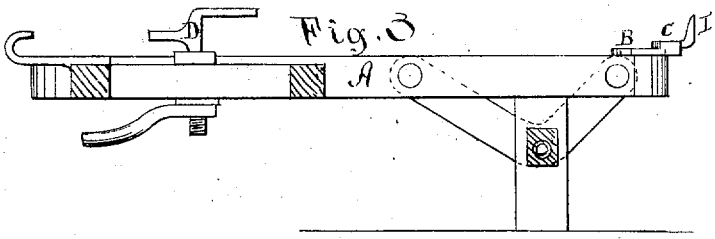
Figure 4:
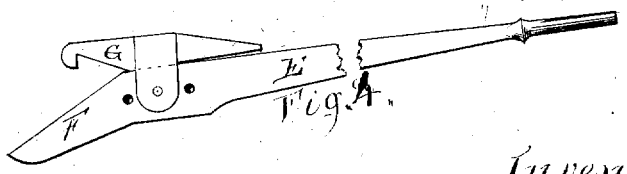

Figure 1 is a perspective view of my invention in operative position. Fig. 2 is a plan view of the frame, with the wheel and tire shown in dotted lines. Fig. 3 is a longitudinal sectional elevation, and Fig. 4 is a side elevation of the lever used for forcing the tire on the wheel.

Heretofore tires have been set while so expanded by heat as to pass over the felly easily, and be secured thereon by shrinkage on cooling. This process is not only troublesome, but is liable to injure the wheels. By my invention the tire is set cold, the wheel being compressed and the tire forced to its place at one operation. My invention, therefore, relates to a method of setting tires without heat; and the apparatus which I have devised to effectuate it consists of a bench, whereon the wheel is laid, with the tire adjusted upon its face at one side, and held by a holder suitably adapted therefor, while the other side of the wheel, on which the tire is to be forced, rests against the end of a curved bar at the end of the frame; and a lever with a hook engaging the upper edge of the tire, while the end takes under the frame, contracts the wheel and stretches the tire down upon the face of the felly in such a manner as to allow of setting the tire without heating it at all, as hereinafter more fully described.

Similar letters of reference indicate like parts.

A is a strong frame, with a curved bar, B, at one end, on which the rim of the wheel lies, and is held at the opposite side by a holder, D, adjustable for wheels of different sizes. Upon plate B is another similarly-curved plate, C, against which the face of the felly or rim of the wheel bears. E is a lever, with its end bent, as at F, to adapt it to engage under the bars B C, while the hook G on the upper side of said lever engages the upper edge of the tire. Above the plate C, said tire rests on the upper side of the wheel, as shown, while on the opposite side, under the holder D, it rests on the face or rim of the wheel.

The parts being so adjusted, and the lever being pulled down, the rim of the wheel will be forced against the bar C and compressed, so that the tire will be easily forced down to its place, or so far as the bar C will permit it to go. Then, by placing the wheel-rim on top of the plate C and against the lugs I, the tire can be forced completely down. The hook G is made adjustable on the lever E to adapt it to wheels having tires of different widths.

Having described my invention, what I claim as new is—

1. In combination, a bench, A, provided with a suitable clamp, D, and curved plates B and C to hold the wheel, and a hooked lever, E, all substantially as described, whereby the wheel may be compressed and the tire drawn on at one operation.

2. The lever E, adapted to use in connection with wheel-bench A, and provided with an adjustable hook, G, to adapt it to tires of different widths.

JOSEPH PAILCA.

Witnesses:
DEXTER WHEELER,
GEORGE H. MILLS.